US012518683B2

(12) United States Patent
Hong et al.

(10) Patent No.: US 12,518,683 B2
(45) Date of Patent: Jan. 6, 2026

(54) DISPLAY DEVICE AND OPERATING METHOD THEREOF

(71) Applicant: LG ELECTRONICS INC., Seoul (KR)

(72) Inventors: Daewoon Hong, Seoul (KR); Jeongtak Oh, Seoul (KR); Baekjun Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/715,517

(22) PCT Filed: Nov. 30, 2022

(86) PCT No.: PCT/KR2022/019291
§ 371 (c)(1),
(2) Date: May 31, 2024

(87) PCT Pub. No.: WO2023/101450
PCT Pub. Date: Jun. 8, 2023

(65) Prior Publication Data

US 2025/0029546 A1 Jan. 23, 2025

(30) Foreign Application Priority Data

Dec. 1, 2021 (KR) ........................ 10-2021-0169919

(51) Int. Cl.
*G09G 3/32* (2016.01)

(52) U.S. Cl.
CPC ....... *G09G 3/32* (2013.01); *G09G 2300/0452* (2013.01); *G09G 2310/08* (2013.01); *G09G 2330/021* (2013.01)

(58) Field of Classification Search
CPC ....... G09G 2300/0452; G09G 2310/08; G09G 2330/021; G09G 3/32
See application file for complete search history.

(56) References Cited

U.S. PATENT DOCUMENTS

2012/0161637 A1* 6/2012 Lee .......................... G09G 3/32 315/122
2018/0174510 A1 6/2018 Lim
(Continued)

FOREIGN PATENT DOCUMENTS

CN 203070687 7/2013
CN 206130651 4/2017
(Continued)

OTHER PUBLICATIONS

PCT International Application No. PCT/KR2022/019291, International Search Report dated Mar. 2, 2023, 4 pages.

*Primary Examiner* — Kenneth Bukowski
(74) *Attorney, Agent, or Firm* — LEE, HONG, DEGERMAN, KANG & WAIMEY

(57) ABSTRACT

A display device and an operating method thereof are disclosed. A display device, according to at least one of various embodiments of the present disclosure, may comprise a display panel including a plurality of light sources and a driver IC connected to the plurality of light sources; and a control circuit that supplies, to the driver IC, power voltage and a data signal through at least one power supply line and data line, respectively, according to an input signal, wherein the control circuit may apply a reference voltage to the at least one power supply line to activate all of the light sources in a row connected through the corresponding power supply line to which the reference voltage has been applied, and may control each of the activated light sources to emit light according to data inputted through each data line in units of columns.

15 Claims, 17 Drawing Sheets

(56) References Cited

U.S. PATENT DOCUMENTS

| | | | | |
|---|---|---|---|---|
| 2019/0371244 | A1* | 12/2019 | Peng | H10K 59/1216 |
| 2020/0052033 | A1* | 2/2020 | Iguchi | H10H 29/142 |
| 2020/0243002 | A1* | 7/2020 | He | G09G 3/2014 |
| 2023/0154390 | A1* | 5/2023 | Ozbas | G09G 3/32 345/694 |
| 2024/0185767 | A1* | 6/2024 | Bower | G09G 3/3426 |

FOREIGN PATENT DOCUMENTS

| | | | | |
|---|---|---|---|---|
| CN | 118215177 | A * | 6/2024 | H05B 45/40 |
| JP | 2003-195811 | | 7/2003 | |
| KR | 10-2009-0061790 | | 6/2009 | |
| KR | 10-2013-0018065 | | 2/2013 | |
| KR | 10-1344447 | | 12/2013 | |
| KR | 10-2018-0061685 | | 6/2018 | |
| KR | 10-2018-0072922 | | 7/2018 | |
| KR | 10-2019-0063233 | | 6/2019 | |
| KR | 10-1985222 | | 6/2019 | |

* cited by examiner

DISPLAY DEVICE AND OPERATING METHOD THEREOF

CROSS-REFERENCE TO RELATED APPLICATION(S)

This application is the National Stage filing under 35 U.S.C. 371 of International Application No. PCT/KR2022/019291, filed on Nov. 30, 2022, which claims the benefit of earlier filing date and right of priority to Korean Application No. 10-2021-0169919, filed on Dec. 1, 2021, the contents of which are all hereby incorporated by reference herein in their entireties.

TECHNICAL FIELD

The present disclosure relates to a display device and an operating method thereof.

BACKGROUND ART

A display has used various types of light sources to display images. The display is implemented in a form that displays input image data as an image using, as a light source, CRT, PDP, OLED, and/or the like, for example.

Meanwhile, LED (Light Emitting Diode) is a light source that has recently been in the spotlight for terminal displays.

To control the LED light source, conventional terminals have employed a passive matrix method that uses a separate external driver IC, an active matrix method that sequentially controls power and signals, and one or two pieces of serial data method.

DISCLOSURE OF INVENTION

Technical Problem

The present disclosure provides a new display structure and control algorithm by improving circuits and devices that control a light source.

The present disclosure provides a display device employing a new display structure and control algorithm and a method of operating the same.

Technical Solution

According to an embodiment of various embodiments of the present disclosure, a display device may include a display panel including a plurality of light sources and driver ICs connected to the plurality of light sources and a control circuit configured to supply a power voltage and a data signal to the driver ICs via at least one power supply line and a data line according to an input signal, wherein the control circuit may apply a reference voltage to the at least one power supply line, activate all of light sources connected in a row via a corresponding power supply line to which the reference voltage is applied, and perform control such that activated light sources emit light according to data respectively input via data lines in units of columns.

According to an embodiment of various embodiments of the present disclosure, an operating method for a display device, the display device including a display panel that includes a plurality of light sources and driver ICs connected to the plurality of light sources, and a control circuit that supplies a power voltage and a data signal to the driver ICs via at least one power supply line and a data line according to an input signal, may include applying a reference voltage to the at least one power supply line, activating all of light sources connected in a row via a corresponding power supply line to which the reference voltage is applied, and performing control such that activated light sources emit light according to data respectively input via data lines in units of columns.

Advantageous Effects

According to at least one of the various embodiments of the present disclosure, it is possible to provide a new display structure and control algorithm by improving circuits and devices that control a light source.

According to at least one of the various embodiments of the present disclosure, it is possible to provide a display device employing a new display structure and control algorithm and a method of operating the same.

BEST MODE

Hereinafter, embodiments related to the present disclosure will be described in more detail with reference to the drawings. The suffixes “module” and “unit or portion” for components used in the following description are merely provided only for facilitation of preparing this specification, and thus they are not granted a specific meaning or function.

A display device according to an embodiment of the present disclosure is, for example, an intelligent display device in which a computer support function is added to a broadcast reception function, and may have an easy-to-use interface such as a handwritten input device, a touch screen, a spatial remote control, or the like since an Internet function is added while fulfilling the broadcast receiving function. Then, with the support of a wired or wireless Internet function, it is possible to perform an e-mail, web browsing, banking, or game function in access to Internet and computers. A standardized general-purpose OS may be used for these various functions.

Accordingly, in the display device described in the present disclosure, various user-friendly functions may be performed because various applications may be freely added or deleted, for example, on a general-purpose OS kernel. More specifically, the display device may be a network TV, Hybrid Broadcast Broadband TV (HBBTV), smart TV, light-emitting diode (LED) TV, organic light-emitting diode (OLED) TV, and the like and may be applied to a smart phone in some cases.

Figure 1:
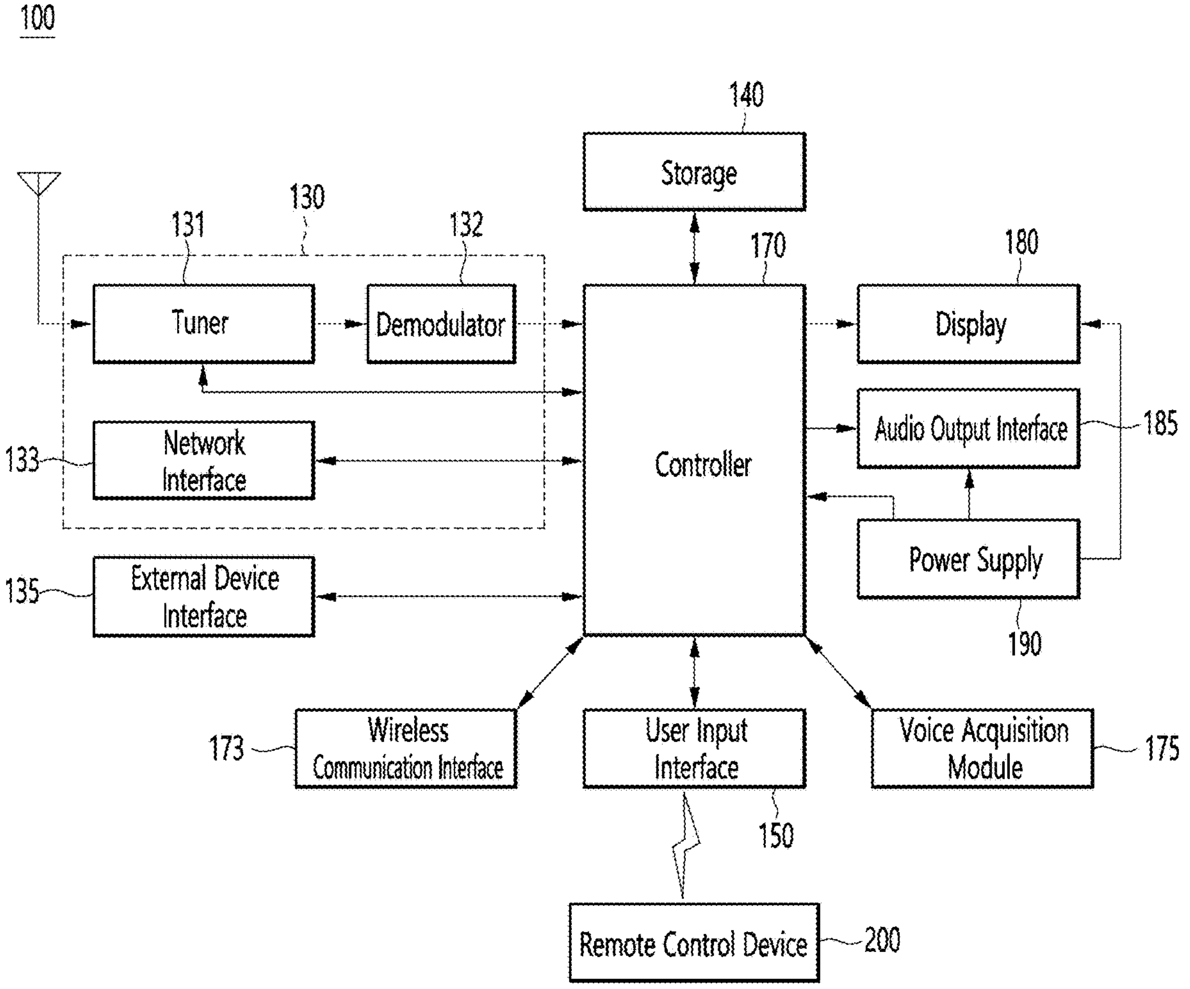
FIG. 1 is a block diagram illustrating a configuration of a display device according to an embodiment of the present disclosure.

FIG. 1 is a block diagram illustrating a configuration of a display device 100 according to an embodiment of the present disclosure.

Referring to FIG. 1, a display device 100 may include a broadcast receiver 130, an external device interface 135, a memory 140, a user input interface 150, a controller 170, a wireless communication interface 173, a display 180, a speaker 185, and a power supply circuit 190.

The broadcast receiver 130 may include a tuner 131, a demodulator 132, and a network interface 133.

The tuner 131 may select a specific broadcast channel according to a channel selection command. The tuner 131 may receive a broadcast signal for the selected specific broadcast channel.

The demodulator 132 may separate the received broadcast signal into a video signal, an audio signal, and a data signal related to a broadcast program, and restore the separated video signal, audio signal, and data signal to a format capable of being output.

The external device interface 135 may receive an application or a list of applications in an external device adjacent thereto, and transmit the same to the controller 170 or the memory 140.

The external device interface 135 may provide a connection path between the display device 100 and an external device. The external device interface 135 may receive one or more of an image and audio output from an external device connected to the display device 100 in a wired or wireless manner, and transmit the same to the controller 170. The external device interface 135 may include a plurality of external input terminals. The plurality of external input terminals may include an RGB terminal, at least one High Definition Multimedia Interface (HDMI) terminal, and a component terminal.

An image signal of the external device input through the external device interface unit 135 may be output through the display 180. A voice signal of the external device input through the external device interface 135 may be output through the speaker 185.

The external device connectable to the external device interface 135 may be any one of a set-top box, a Blu-ray player, a DVD player, a game machine, a sound bar, a smartphone, a PC, a USB memory, and a home theater, but this is only an example.

The network interface 133 may provide an interface for connecting the display device 100 to a wired/wireless network including an Internet network. The network interface 133 may transmit or receive data to or from other users or other electronic devices through a connected network or another network linked to the connected network.

In addition, a part of content data stored in the display device 100 may be transmitted to a selected user among a selected user or a selected electronic device among other users or other electronic devices registered in advance in the display device 100.

The network interface 133 may access a predetermined web page through the connected network or the other network linked to the connected network. That is, the network interface unit 133 may transmit or receive data to or from a corresponding server by accessing a predetermined webpage through the network.

In addition, the network interface 133 may receive content or data provided by a content provider or a network operator. That is, the network interface 133 may receive content such as movies, advertisements, games, VOD, and broadcast signals and information related thereto, which are provided from a content provider or a network provider through a network.

In addition, the network interface 133 may receive update information and update files of firmware provided by the network operator, and may transmit data to an Internet or content provider or a network operator.

The network interface 133 may select and receive a desired application from among applications that are open to the public through a network.

The memory 140 may store programs for signal processing and control of the controller 170, and may store video, audio, or data signals, which have been subjected to signal-processed.

In addition, the memory 140 may perform a function for temporarily storing video, audio, or data signals input from an external device interface 135 or the network interface 133, and store information on a predetermined image through a channel storage function.

The memory 140 may store an application or a list of applications input from the external device interface 135 or the network interface 133.

The display device 100 may play back a content file (a moving image file, a still image file, a music file, a document file, an application file, or the like) stored in the memory 140 and provide the same to the user.

The user input interface 150 may transmit a signal input by the user to the controller 170 or a signal from the controller 170 to the user. For example, the user input interface 150 may receive and process a control signal such as power on/off, channel selection, screen settings, and the like from the remote control device 200 in accordance with various communication methods, such as a Bluetooth communication method, a UWB (Ultra Wideband) communication method, a ZigBee communication method, an RF (Radio Frequency) communication method, or an infrared (IR) communication method or may perform processing to transmit the control signal from the controller 170 to the remote control device 200.

In addition, the user input interface 150 may transmit a control signal input from a local key (not shown) such as a power key, a channel key, a volume key, and a setting value to the controller 170.

The image signal image-processed by the controller 170 may be input to the display 180 and displayed as an image corresponding to a corresponding image signal. Also, the image signal image-processed by the controller 170 may be input to an external output device through the external device interface 135.

The voice signal processed by the controller 170 may be output to the speaker 185. Also, the audio signal processed by the controller 170 may be input to the external output device through the external device interface 135.

In addition, the controller 170 may control the overall operation of the display device 100.

In addition, the controller 170 may control the display device 100 by a user command input through the user input interface 150 or an internal program and connect to a network to download an application a list of applications or applications desired by the user to the display device 100.

The controller 170 may allow the channel information or the like selected by the user to be output through the display 180 or the speaker 185 along with the processed image or voice signal.

In addition, the controller 170 may output a video signal or an audio signal through the display 180 or the speaker 185, according to a command for playing back a video of an external device through the user input interface 150, the video signal or the audio signal being input from an external device, for example, a camera or a camcorder, through the external device interface 135.

Meanwhile, the controller 170 may allow the display 180 to display an image, for example, allow a broadcast video which is input through the tuner 131 or an external input video which is input through the external device interface 135, a video which is input through the network interface unit or a video which is stored in the memory 140 to be displayed on the display 180. In this case, an image being displayed on the display 180 may be a still image or a moving image, and may be a 2D image or a 3D image.

In addition, the controller 170 may allow content stored in the display device 100, received broadcast content, or external input content input from the outside to be played back, and the content may have various forms such as a broadcast video, an external input video, an audio file, still images, accessed web screens, and document files.

The wireless communication interface 173 may communicate with an external device through wired or wireless communication. The wireless communication interface 173 may perform short range communication with an external device. To this end, the wireless communication interface 173 may support short range communication using at least one of Bluetooth™, Radio Frequency Identification (RFID), Infrared Data Association (IrDA), Ultra Wideband (UWB), ZigBee, Near Field Communication (NFC), Wi-Fi (Wireless-Fidelity), Wi-Fi (Wireless-Fidelity), Wi-Fi Direct, and Wireless USB (Wireless Universal Serial Bus) technologies. The wireless communication interface 173 may support wireless communication between the display device 100 and a wireless communication system, between the display device 100 and another display device 100, or between the display device 100 and a network in which the display device 100 (or an external server) is located through wireless area networks. The wireless area networks may be wireless personal area networks.

Here, the another display device 100 may be a wearable device (e.g., a smartwatch, smart glasses or a head-mounted display (HMD), a mobile terminal such as a smart phone, which is able to exchange data (or interwork) with the display device 100 according to the present disclosure. The wireless communication interface 173 may detect (or recognize) a wearable device capable of communication around the display device 100.

Furthermore, when the detected wearable device is an authenticated device to communicate with the display device 100 according to the present disclosure, the controller 170 may transmit at least a portion of data processed by the display device 100 to the wearable device through the wireless communication interface 173. Therefore, a user of the wearable device may use data processed by the display device 100 through the wearable device.

The display 180 may convert image signals, data signals, and OSD signals processed by the controller 170, or image signals or data signals received from the external device interface 135 into R, G, and B signals, and generate drive signals.

Meanwhile, since the display device 100 shown in FIG. 1 is only an embodiment of the present disclosure, some of the components shown can be integrated, added, or omitted according to the specification of the actually implemented display device 100.

That is, two or more components may be combined into one component, or one component may be divided into two or more components as necessary. In addition, a function performed in each block is for describing an embodiment of the present disclosure, and its specific operation or device does not limit the scope of the present disclosure.

According to another embodiment of the present disclosure, unlike the display device 100 shown in FIG. 1, the display device 100 may receive an image through the network interface 133 or the external device interface 135 without a tuner 131 and a demodulator 132 and play back the same.

For example, the display device 100 may be divided into an image processing device, such as a set-top box, for receiving broadcast signals or content according to various network services, and a content playback device that plays back content input from the image processing device.

In this case, an operation method of the display device according to an embodiment of the present disclosure will be described below may be implemented by not only the display device 100 as described with reference to FIG. 1 and but also one of an image processing device such as the separated set-top box and a content playback device including the display 180 and the speaker 185.

Next, a remote control device according to an embodiment of the present disclosure will be described with reference to FIGS. 2 to 3.

Figure 2:
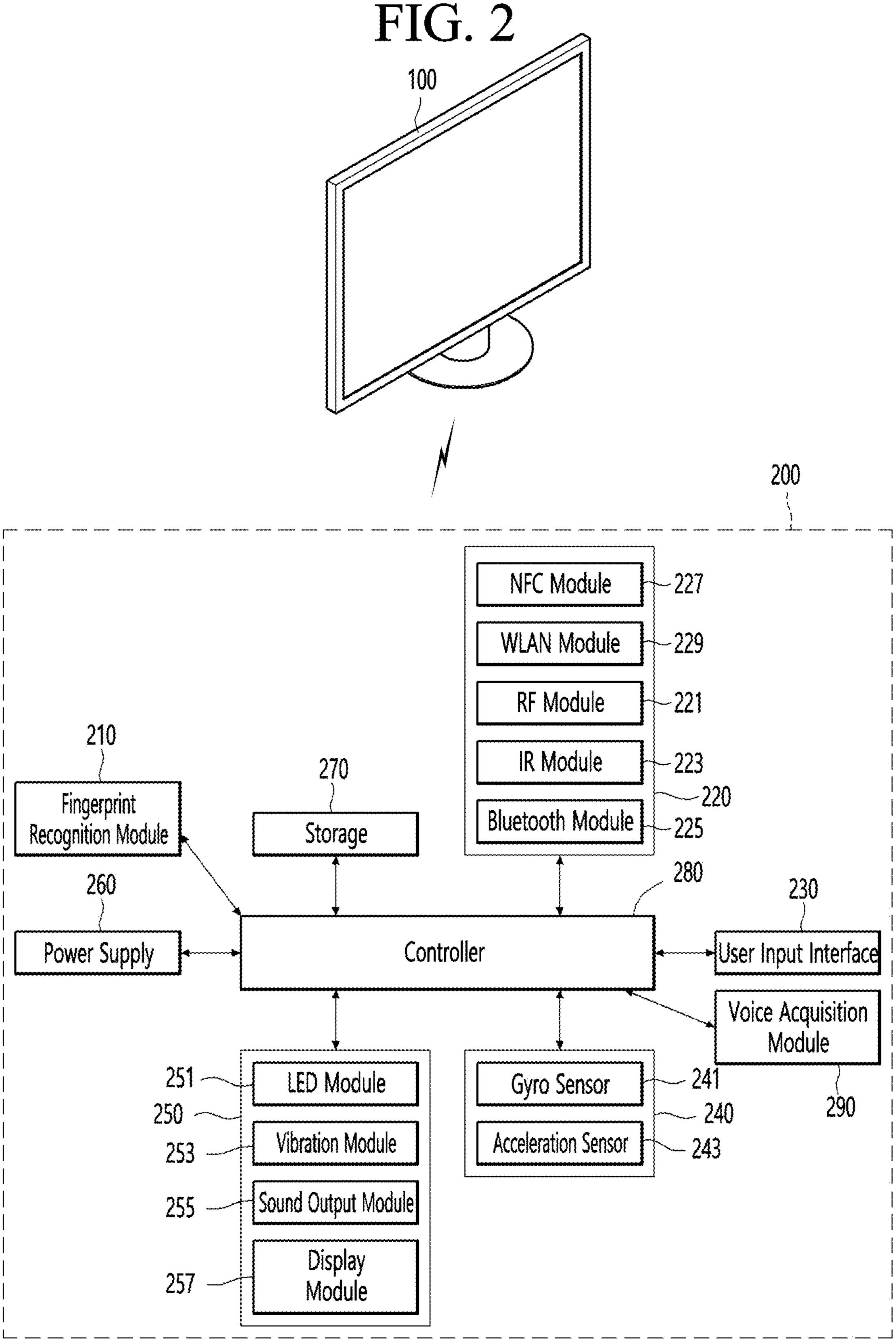
FIG. 2 is a block diagram illustrating a remote control device according to an embodiment of the present disclosure.
Figure 3:
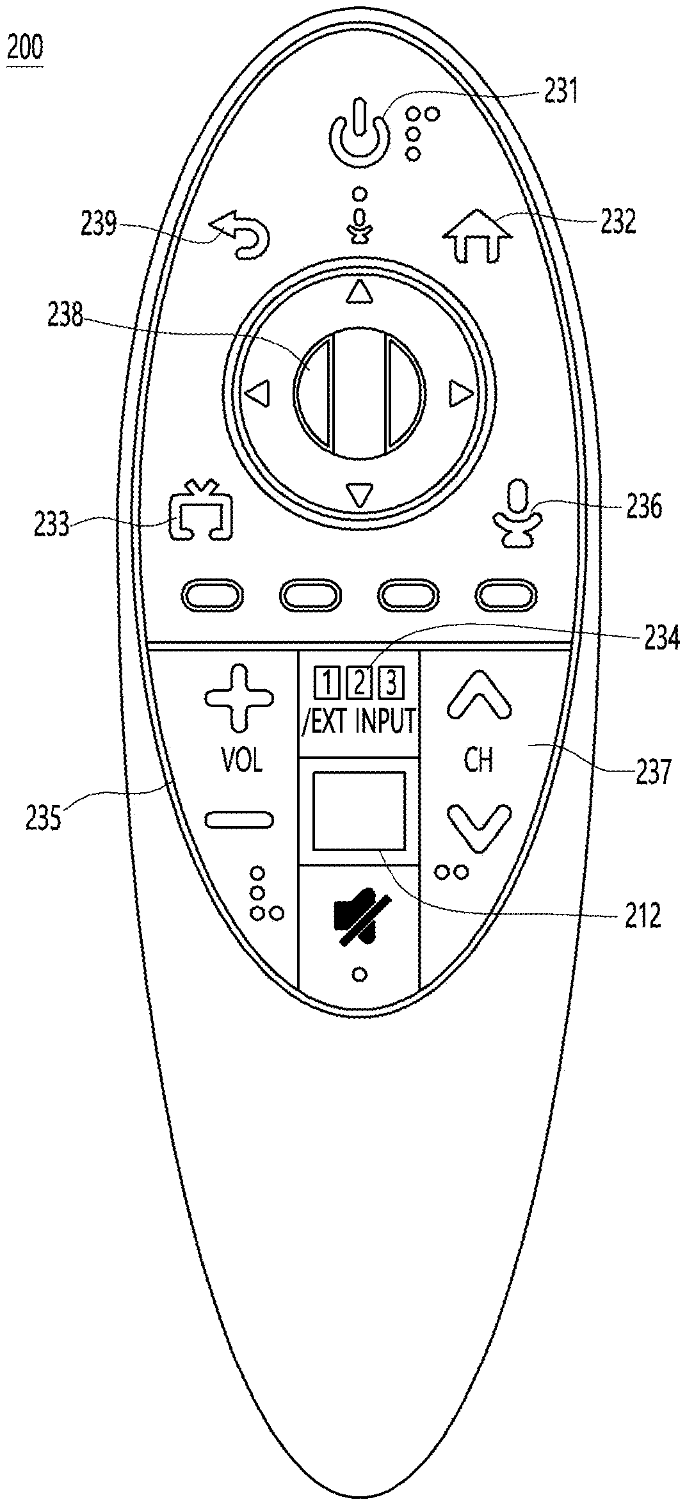
FIG. 3 illustrates an example of an actual configuration of a remote control device according to an embodiment of the present disclosure.

FIG. 2 is a block diagram of a remote control device according to an embodiment of the present disclosure, and FIG. 3 illustrates an actual configuration example of a remote control device 200 according to an embodiment of the present disclosure.

First, referring to FIG. 2, the remote control device 200 may include a fingerprint reader 210, a wireless communication circuit 220, a user input interface 230, a sensor 240, an output interface 250, a power supply circuit 260, a memory 270, a controller 280, and a microphone 290.

Referring to FIG. 2, the wireless communication circuit 220 may transmit and receive signals to and from any one of display devices 100 according to embodiments of the present disclosure described above.

The remote control device 200 may include an RF circuit 221 capable of transmitting and receiving signals to and from the display device 100 according to the RF communication standard, and an IR circuit 223 capable of transmitting and receiving signals to and from the display device 100 according to the IR communication standard. In addition, the remote control device 200 may include a Bluetooth circuit 225 capable of transmitting and receiving signals to and from the display device 100 according to the Bluetooth communication standard. In addition, the remote control device 200 may include an NFC circuit 227 capable of transmitting and receiving signals to and from the display device 100 according to the NFC (near field communication) communication standard, and a WLAN circuit 229 capable of transmitting and receiving signals to and from the display device 100 according to the wireless LAN (WLAN) communication standard.

In addition, the remote control device 200 may transmit a signal containing information on the movement of the remote control device 200 to the display device 100 through the wireless communication circuit 220.

In addition, the remote control device 200 may receive a signal transmitted by the display device 100 through the RF circuit 221, and transmit a command regarding power on/off, channel change, volume adjustment, or the like to the display device 100 through the IR circuit 223 as necessary.

The user input interface 230 may include a keypad, a button, a touch pad, a touch screen, or the like. The user may input a command related to the display device 100 to the remote control device 200 by operating the user input interface 230. When the user input interface 230 includes a hard key button, the user may input a command related to the display device 100 to the remote control device 200 through a push operation of the hard key button. Details will be described with reference to FIG. 3.

Referring to FIG. 3, the remote control device 200 may include a plurality of buttons. The plurality of buttons may include a fingerprint recognition button 212, a power button 231, a home button 232, a live button 233, an external input button 234, a volume control button 235, a voice recognition button 236, a channel change button 237, an OK button 238, and a back-play button 239.

The fingerprint recognition button 212 may be a button for recognizing a user's fingerprint. In one embodiment, the fingerprint recognition button 212 may enable a push operation, and thus may receive a push operation and a fingerprint recognition operation.

The power button 231 may be a button for turning on/off the power of the display device 100.

The home button 232 may be a button for moving to the home screen of the display device 100.

The live button 233 may be a button for displaying a real-time broadcast program.

The external input button 234 may be a button for receiving an external input connected to the display device 100.

The volume control button 235 may be a button for adjusting the level of the volume output by the display device 100.

The voice recognition button 236 may be a button for receiving a user's voice and recognizing the received voice.

The channel change button 237 may be a button for receiving a broadcast signal of a specific broadcast channel.

The OK button 238 may be a button for selecting a specific function, and the back-play button 239 may be a button for returning to a previous screen.

A description will be given referring again to FIG. 2.

When the user input interface 230 includes a touch screen, the user may input a command related to the display device 100 to the remote control device 200 by touching a soft key of the touch screen. In addition, the user input interface 230 may include various types of input means that may be operated by a user, such as a scroll key or a jog key, and the present embodiment does not limit the scope of the present disclosure.

The sensor 240 may include a gyro sensor 241 or an acceleration sensor 243, and the gyro sensor 241 may sense information regarding the movement of the remote control device 200.

For example, the gyro sensor 241 may sense information about the operation of the remote control device 200 based on the x, y, and z axes, and the acceleration sensor 243 may sense information about the moving speed of the remote control device 200. Meanwhile, the remote control device 200 may further include a distance measuring sensor to sense the distance between the display device 100 and the display 180.

The output interface 250 may output an image or audio signal corresponding to the operation of the user input interface 230 or a signal transmitted from the display device 100.

The user may recognize whether the user input interface 230 is operated or whether the display device 100 is controlled through the output interface 250.

For example, the output interface 450 may include an LED 251 that emits light when the user input interface 230 is operated or a signal is transmitted and received to and from the display device 100 through a wireless communication circuit 225, a vibrator 253 that generates vibration, a speaker 255 that outputs sound, or a display 257 that outputs an image.

In addition, the power supply circuit 260 may supply power to the remote control device 200, and stop power supply when the remote control device 200 has not moved for a predetermined time to reduce power consumption.

The power supply circuit 260 may restart power supply when a predetermined key provided in the remote control device 200 is operated.

The memory 270 may store various types of programs and application data required for control or operation of the remote control device 200.

When the remote control device 200 transmits and receives signals wirelessly through the display device 100 and the RF circuit 221, the remote control device 200 and the display device 100 transmit and receive signals through a predetermined frequency band.

The controller 280 of the remote control device may store and refer to information on a frequency band capable of wirelessly transmitting and receiving signals to and from the display device 100 paired with the remote control device 200 in the memory 270.

The controller 280 may control all matters related to the control of the remote control device 200. The controller 280 may transmit a signal corresponding to a predetermined key operation of the user input interface 230 or a signal corresponding to the movement of the remote control device 200 sensed by the sensor 240 through the wireless communication circuit 225.

Also, the microphone 290 of the remote control device 200 may obtain a speech.

A plurality of microphones 290 may be provided.

Next, a description will be given referring to FIG. 4.

Figure 4:
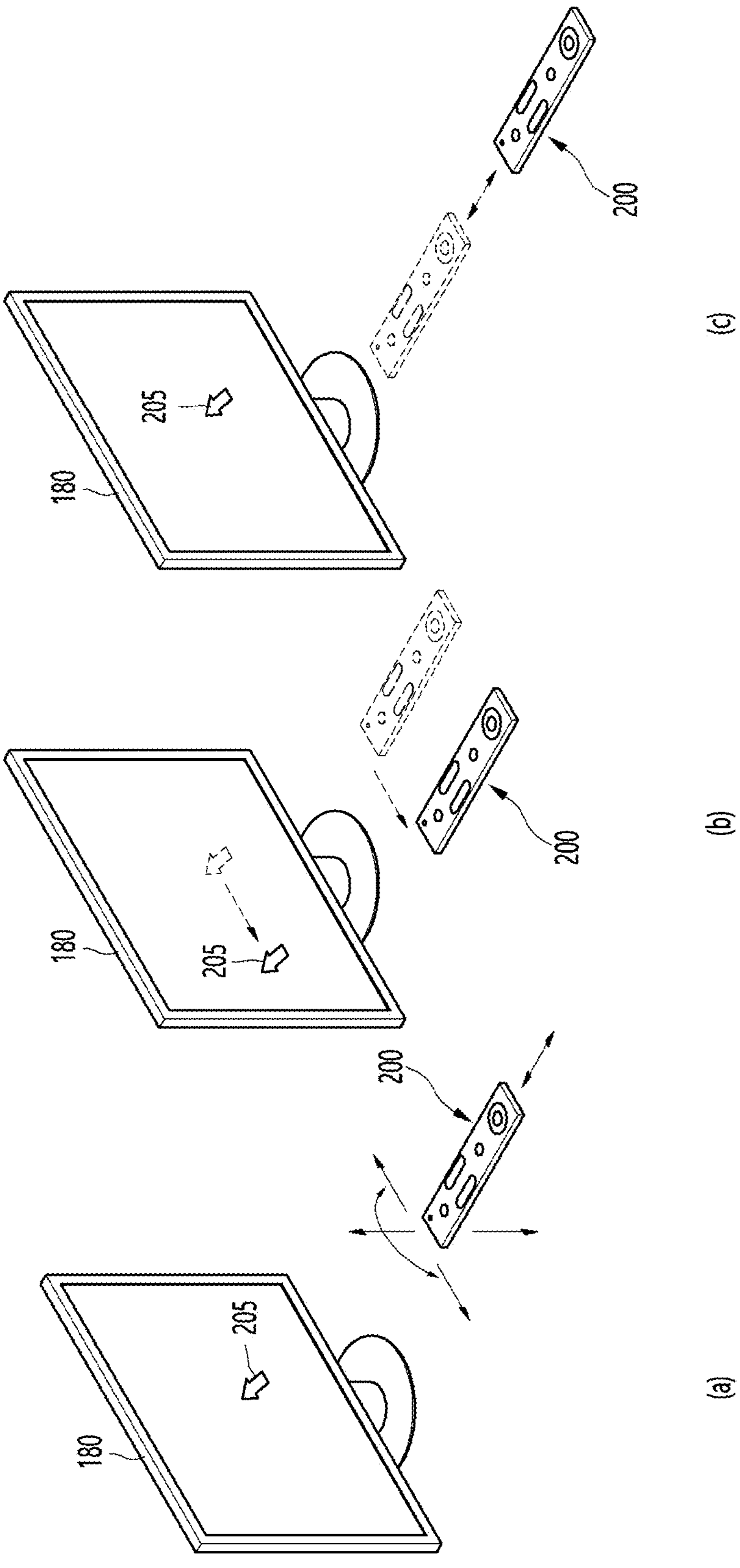
FIG. 4 is a view of utilizing a remote control device according to an embodiment of the present invention.

FIG. 4 illustrates an example of using the remote control device 200 according to an embodiment of the present disclosure.

In FIG. 4, (a) illustrates that a pointer 205 corresponding to the remote control device 200 is displayed on the display 180.

The user may move or rotate the remote control device 200 up, down, left and right. The pointer 205 displayed on the display 180 of the display device 100 may correspond to the movement of the remote control device 200. Since the corresponding pointer 205 is moved and displayed according to a movement on a 3D space as illustrate in the drawing, the remote control device 200 may be referred to as a spatial remote control device.

In (b) of FIG. 4, it is illustrated that that when the user moves the remote control device 200 to the left, the pointer 205 displayed on the display 180 of the display device 100 moves to the left correspondingly.

Information on the movement of the remote control device 200 detected through a sensor of the remote control device 200 is transmitted to the display device 100. The display device 100 may calculate the coordinates of the pointer 205 based on information on the movement of the remote control device 200. The display device 100 may display the pointer 205 to correspond to the calculated coordinates.

In (c) of FIG. 4, it is illustrated that a user moves the remote control device 200 away from the display 180 while pressing a specific button in the remote control device 200. Accordingly, a selected area in the display 180 corresponding to the pointer 205 may be zoomed in and displayed enlarged.

Conversely, when the user moves the remote control device 200 to be close to the display 180, the selected area in the display 180 corresponding to the pointer 205 may be zoomed out and displayed reduced.

On the other hand, when the remote control device 200 moves away from the display 180, the selected area may be zoomed out, and when the remote control device 200 moves to be close to the display 180, the selected area may be zoomed in.

Also, in a state in which a specific button in the remote control device 200 is being pressed, recognition of up, down, left, or right movements may be excluded. That is, when the remote control device 200 moves away from or close to the display 180, the up, down, left, or right movements are not recognized, and only the forward and backward movements may be recognized. In a state in which a specific button in the remote control device 200 is not being pressed, only the pointer 205 moves according to the up, down, left, or right movements of the remote control device 200.

Meanwhile, the movement speed or the movement direction of the pointer 205 may correspond to the movement speed or the movement direction of the remote control device 200.

Meanwhile, in the present specification, a pointer refers to an object displayed on the display 180 in response to an operation of the remote control device 200. Therefore, in addition to the arrow shape shown in the drawing as the pointer 205, objects of various shapes are possible and may include, for example, a point, a cursor, a prompt, a thick outline, and/or the like. In addition, the pointer 205 may be displayed corresponding to any one point among points on a horizontal axis and a vertical axis on the display 180, and may also be displayed corresponding to a plurality of points such as a line and a surface.

Figure 5:
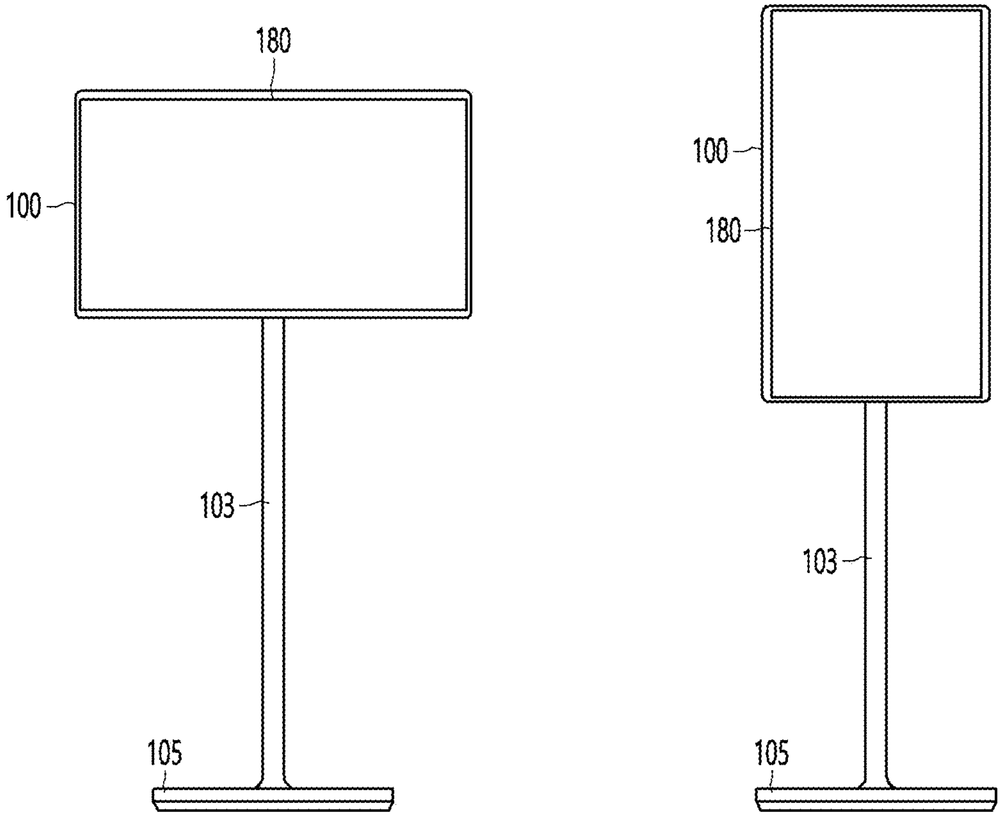
FIG. 5 is a diagram for describing a horizontal mode and a vertical mode of a stand-type display device according to an embodiment of the present disclosure.

FIG. 5 (*a*) and FIG. 5 (*b*) are diagrams for describing a horizontal mode and a vertical mode of a stand-type display device according to an embodiment of the present disclosure.

Referring to (a) and (b) in FIG. 5, a stand type display device 100 is shown.

The shaft 100 and the stand base 105 may be coupled to the display device 100.

The shaft 103 may couple the display device 100 and a stand base 105. The shaft 103 may extend vertically.

The lower end of the shaft 103 may be coupled to an edge of the stand base 105.

The lower end of the shaft 103 may be rotatably coupled to the edge of the stand base 105.

The display device 100 and the shaft 103 may rotate about an axis perpendicular to the stand base 105.

The upper portion of the shaft 103 may be coupled to the back of the display device 100.

The stand base 105 may serve to support the display device 100.

The display device 100 may include the head 103 and the stand base 105.

The display device 100 may rotate about a point where the upper portion of the shaft 103 and the back of the display 180 meet.

In (a) of FIG. 5, it is shown that the display device operates in a landscape mode in which the horizontal length of the display 180 is greater than the vertical length, and in (b) of FIG. 5, it is shown that the display device operates in a portrait mode in which the vertical length of the display 180 is greater than the horizontal length.

The user may move while carrying the stand-type display device. In other words, the stand-type display device 100 has improved mobility unlike a fixed device, so that a user is not restricted to a placement position.

Hereinafter, the present disclosure proposes a new display structure and control algorithm by improving a circuit and an element controlling a light source, and describes in more detail a display device employing the same and a method of operation thereof.

In the present disclosure, the light source is an LED light source as an example, but is not limited thereto.

In addition, the display device 100 is described using, but not limited to, a transparent display device as an example.

Further, the display device 100 may be a digital signage.

Figure 6:
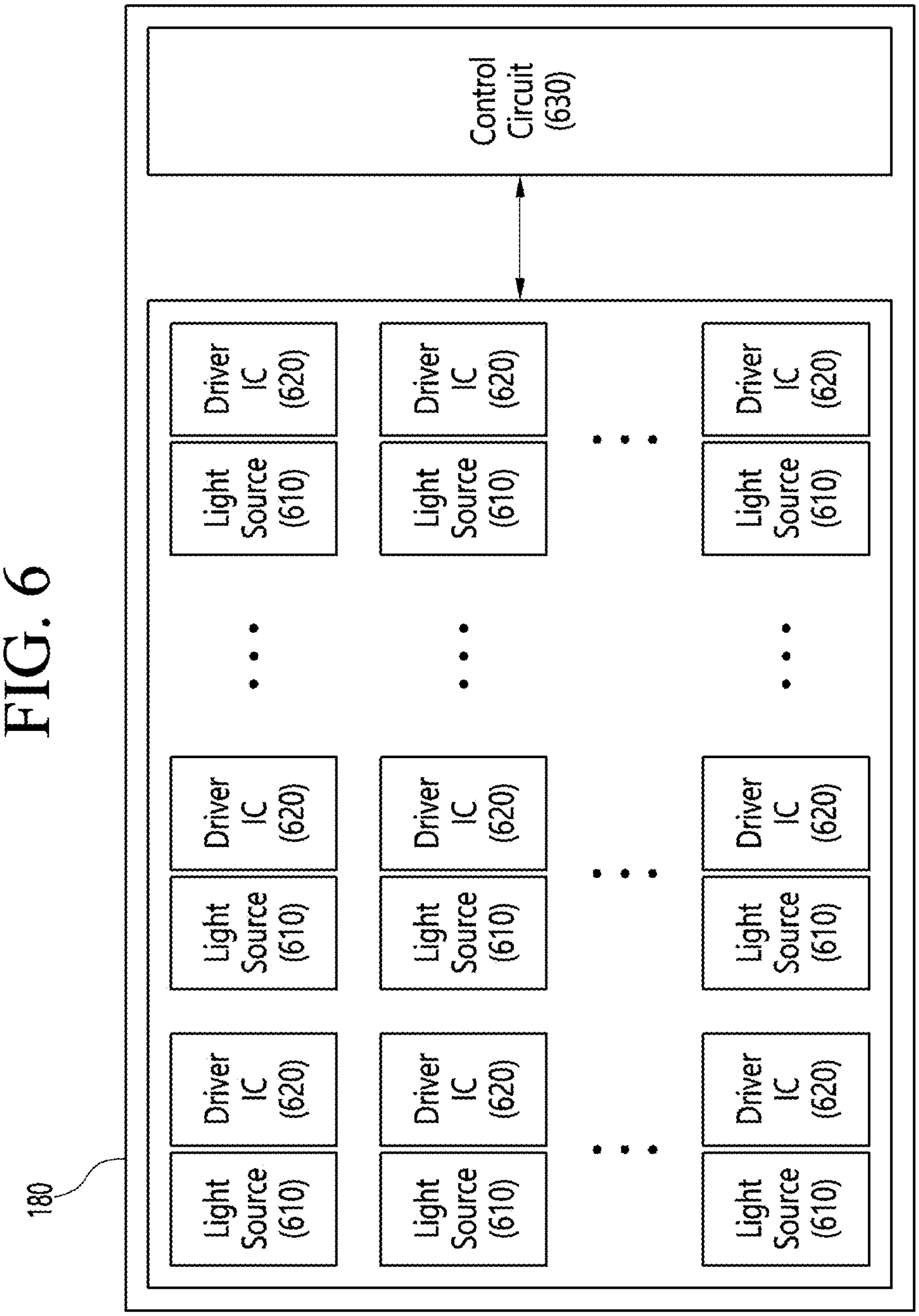
FIG. 6 is a diagram for describing a display structure employed in a display device according to the present disclosure.

FIG. 6 is a diagram for describing a display structure employed in a display device 100 according to the present disclosure.

Referring to FIG. 6, the display device 100 according to an embodiment of the present disclosure may include a display 180. For ease of description, only configurations relevant to the present disclosure are shown in FIG. 6, but are not limited thereto. Accordingly, the description of other components associated with the display device 100 refers to the description of FIGS. 1 to 5 above, and duplication of description is omitted herein.

The display 180 may include a display panel that includes a plurality of light sources 610, driver ICs 620 respectively connected to the light sources 610, and a control circuit 630 that controls the driver IC 620 (or the light sources 610). In the present disclosure, one control circuit 630 may control all of the light sources 610 and the driver ICs 620.

There may be n×m light source-driver ICs, where n and m are both natural numbers, which may be determined by considering the size of the display panel employed in the display device 100.

The control circuit 630 may supply a reference voltage and a data signal to the driver ICs 620 to drive the LED light sources 610 via power supply lines and data lines according to an input signal.

Hereinafter, the structure of the display is described in terms of rows and columns for convenience of description, but should not be construed as being limiting in any way.

The control circuit 630 may include data terminals connected to data lines via which data is supplied to the driver ICs 620 in each column, and power supply terminals connected to power supply lines via which power is supplied to the driver ICs 620 in each row.

The control circuit 630 may apply a reference voltage through at least one of the power supply terminals to activate the light sources through all of the driver ICs 620 connected to a corresponding power supply terminal to which the reference voltage is applied. In this context, activation may refer to a state of being able to receive data input supplied via a data line, including turn-on.

The control circuit 630 may respectively control light sources to emit light in response to data input via the data lines of the driver ICs 620.

Figure 7:
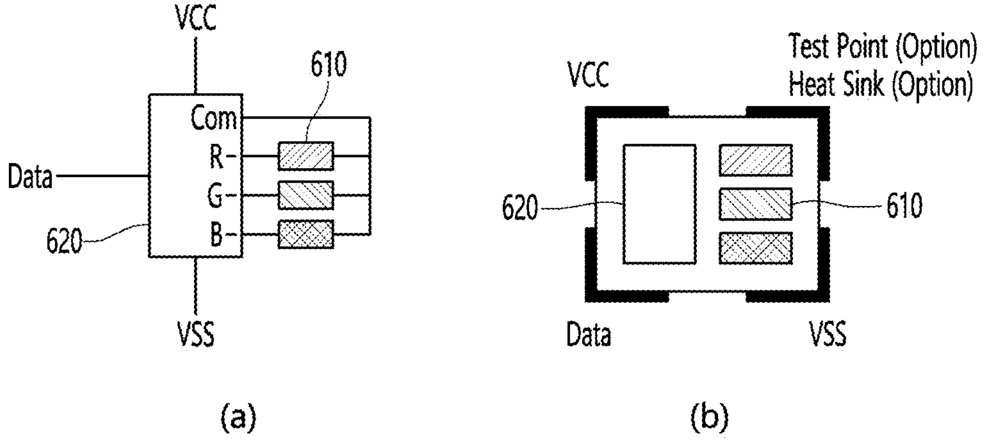
FIG. 7 is a diagram for describing an LED light source and an LED package in accordance with an embodiment of the present disclosure.

FIG. 7 is a diagram for describing an LED light source and an LED package in accordance with an embodiment of the present disclosure.

Figure 8:
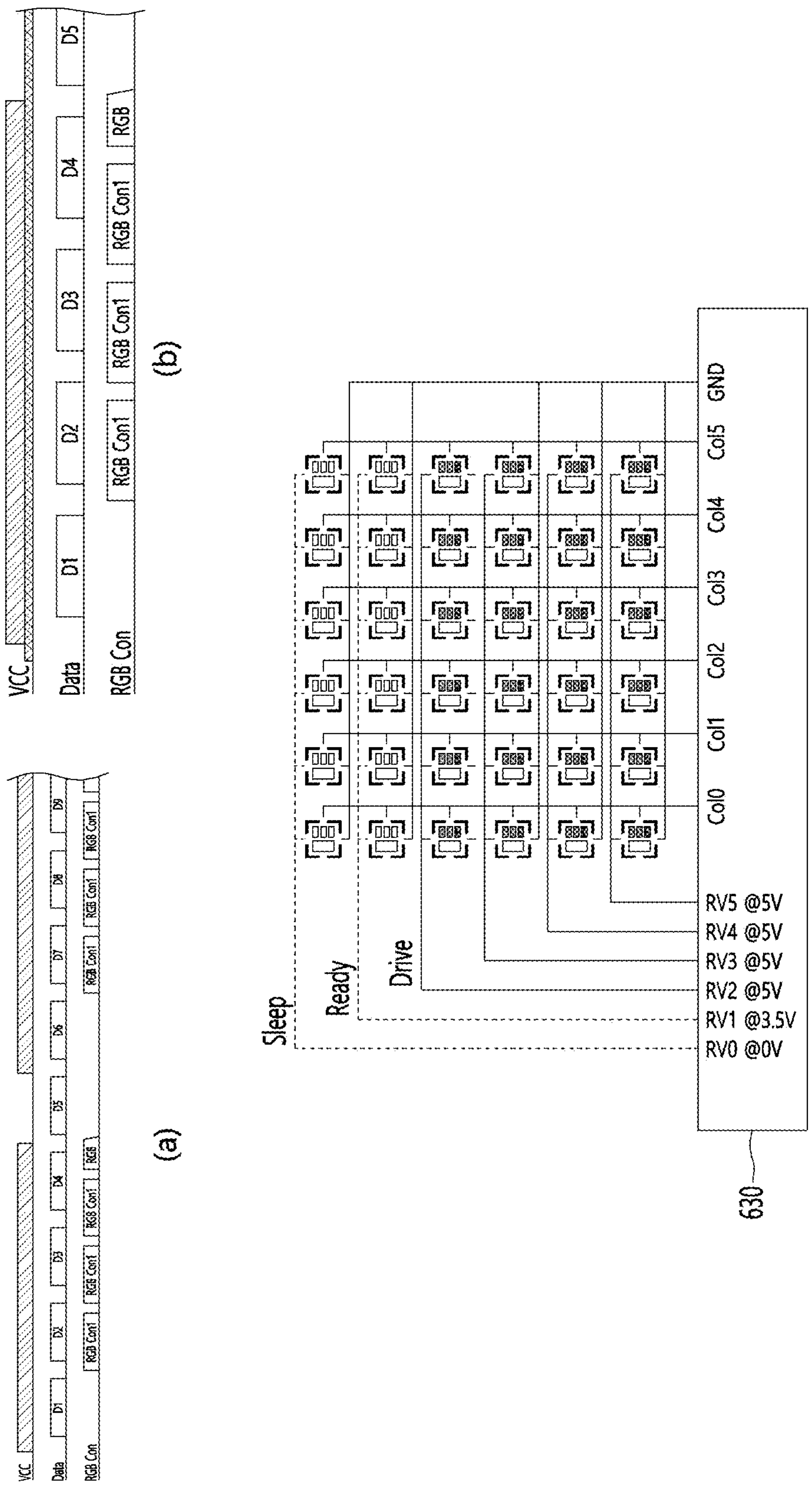
FIG. 8 is a diagram for describing control of driving of a driver IC according to an embodiment of the present disclosure.

FIG. 8 is a diagram illustrating control for driving a driver IC according to an embodiment of the present disclosure.

In (a) of FIG. 7, an LED light source 610 and a driver IC 620 are shown.

Referring to (a) of FIG. 7, the driver IC 620 may be disposed near the LED light source 610. In this case, the driver IC 620 may include 3PAD, i.e., at least three terminals, one of the three terminals may be for a data terminal and the other two terminals may be for power supply terminals. Further, the data terminal is a terminal for data-in, and as shown in (a) of FIG. 7, the driver IC 620 may not have a data-out terminal. On the other hand, one of the two power supply terminals is a power supply (VCC) terminal and the other is a ground (VSS) terminal.

Referring to (b) in FIG. 7 an LED package is shown that packages the LED light source 610 and the driver IC 620 shown in (a) of FIG. 7. Referring to (b) of FIG. 7, the LED package may be designed to repeatedly perform operation of a single condition, for example, to minimize IC size.

The LED package may also be formed with only three terminals, and the remaining terminal may be unused, but may be utilized for a test point or heat sink. However, it is not limited thereto.

The structure of the LED light source-driver IC set shown in (a) of FIG. 7 is different from the structure of a conventional PM (Passive Matrix) type, AM (Active Matrix) type, or Sequential type. Accordingly, the LED package illustrated in (b) of FIG. 7 may also have a different structure from the LED package of any of the aforementioned types.

FIG. 8 (*a*) is a graph illustrating a drive control sequence of the driver IC 620, FIG. 8 (*b*) is a graph for describing a method for application of a voltage level of the driver IC 620, and FIG. 8 (*c*) is a diagram for describing a drive control mode of FIG. 8 (*a*) described above.

Referring to (a) of FIG. 8, the driver IC 620 may be switched to the sleep, ready, and drive/maintain mode states based on a power voltage level input via the control circuit 630.

For example, the driver IC 620 may operate in or transition to the sleep mode when a power source (i.e., voltage) less than a reference voltage is applied, operate in or transition to the ready mode when the reference voltage is applied, and operate in or transition to the drive/maintain mode when a power source (i.e., voltage) greater than the reference voltage is applied. However, the present disclosure is not limited thereto, and the modes or their definitions may differ from those described above.

The driver IC 620 may control the driving of the LED light source 610 when first data is input in the ready mode state, and may then maintain control of the driving of the LED light source 610 when the power source is continuously above the reference voltage.

On the other hand, the driver IC 620 may continue to monitor the power source even after maintaining control of driving of the LED light source 610, and when the power source drops below the reference voltage as a result of monitoring, switch modes such that the LED light source 610 is turned off. The driver IC 620 may be switched to the sleep mode until the next voltage condition is satisfied after the LED light source 610 has been turned off.

That is, when the power source (i.e., voltage) greater than the reference voltage is supplied to the power source (VCC) terminal through the control circuit 630, the driver IC 620 may enter the ready mode waiting for input from the data line, and when input is received at the data terminal, the driver IC 620 may obtain the serial data required for control of driving of the LED light source 610 and control of driving of the LED light source 610. However, any subsequent data coming into the data line may be ignored. In this case, in order to update new data (e.g., the next frame, etc.), a voltage at the power terminal may decrease below a threshold to turn off the driver IC 620 (and/or the LED light source 610), so that the driver IC 620 switches to (or enters) the sleep mode and then switches back to the ready state.

The display device 100 may set a limited voltage reference for fast system operation, such that only a small voltage difference (e.g., using 5 V and 3.5 V rather than 5 V and 0 V) is required to switch operating modes.

In (c) of FIG. 8, the state of the LED light source 610 according to the power source is illustrated in (a) and (b) of FIG. 8 above.

For example, when the power voltage, which is applied to the driver IC 620 via the control circuit 630, is 0 volts, the LED light source 610 or the driver IC 620 may enter the sleep mode, when the applied power voltage is 3.5 volts, the LED light source 610 or the driver IC 620 may enter the ready mode, and when the applied power voltage is 5 volts or more, the LED light source 610 or the driver IC 620 may operate in the drive or maintain mode.

The values of the power voltage or reference voltage described herein are illustrative and are not limited thereto.

FIGS. 9 to 12 are drawings for describing a process for controlling the LED light source 610 in the driver IC 620 according to an embodiment of the present disclosure.

Figure 13:
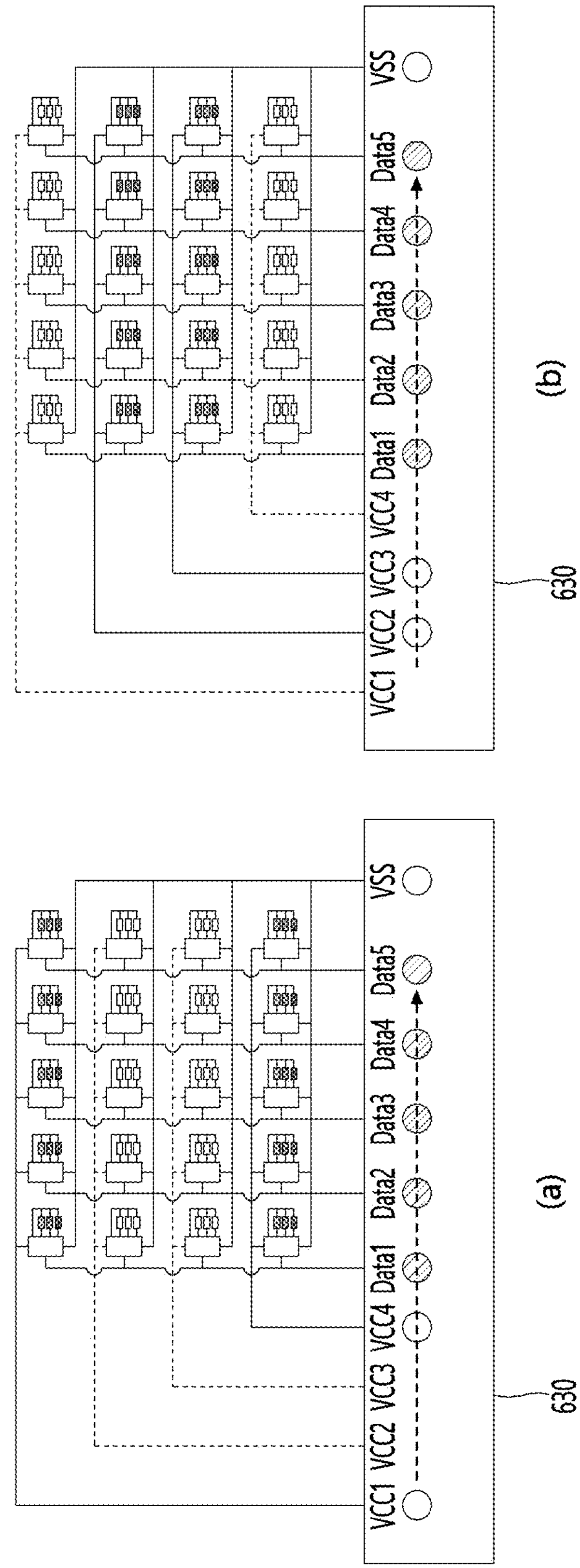
FIG. 13 is a diagram for describing a process of controlling an LED light source in a driver IC according to an embodiment of the present disclosure.

FIG. 13 is a diagram for describing a process for controlling the LED light source 610 in the driver IC 620 according to an embodiment of the present disclosure.

First, FIGS. 9-12 will be described as follows.

FIGS. 9 to 12 illustrate a sequential process for ease of understanding and description of the present disclosure.

Figure 9:
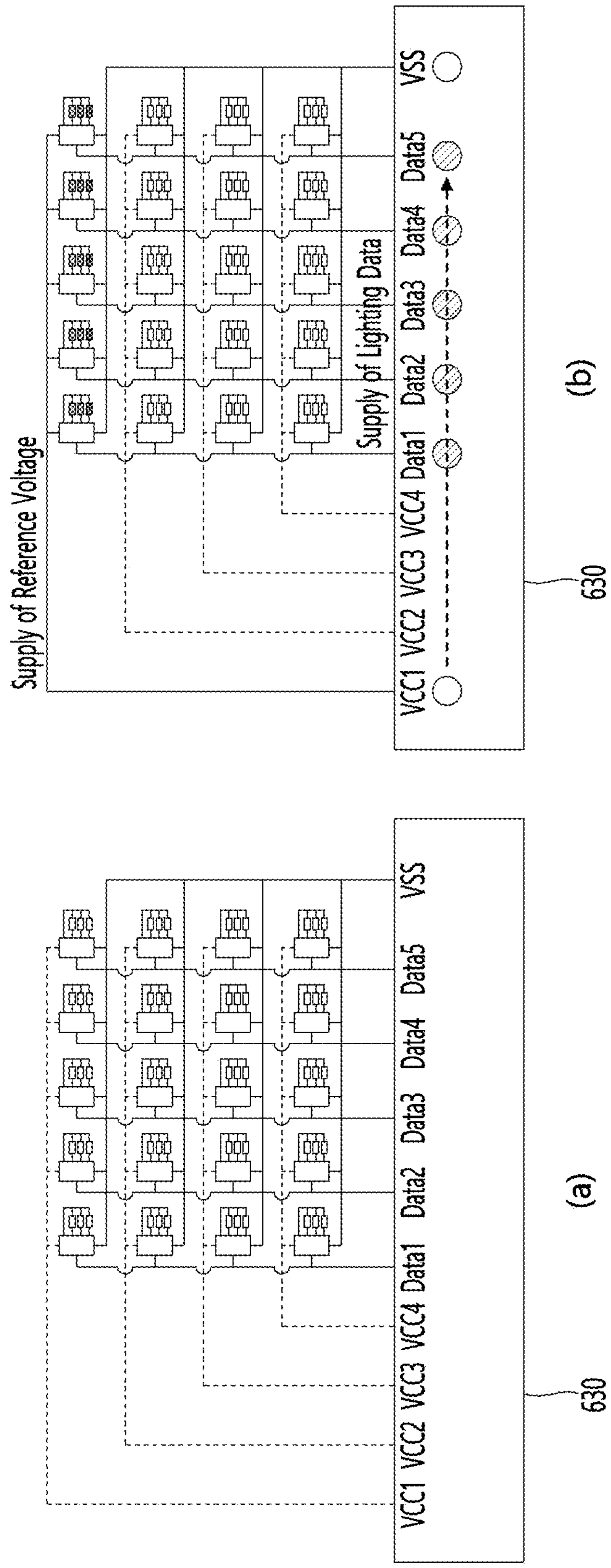
FIGS. 9 to 12 are diagrams for describing a process of controlling an LED light source in a driver IC according to an embodiment of the present disclosure.

In (a) of FIG. 9, a plurality of LED light sources 610 and driver ICs 620 are respectively connected, and are also connected to a control circuit 630 via a power supply line and a data line. Thus, the control circuit 630 may supply a power voltage and a data signal to the driver IC 620 to control the emission of the LED light sources 610.

In other words, when the system operates, the control circuit 630 may supply a reference voltage and a data signal for each line to the driver IC 620 according to an image signal.

Referring to (b) of FIG. 9, when the system operates, a reference voltage is supplied to LED light sources in a first row via the control circuit 630, and driver ICs 620 respectively connected to the LED light sources in the first row may be in the ready mode waiting for signal information to be provided to the data input terminal. All of the driver ICs 620 in the first row (or row) may be remained in the ready state.

Then, data for each LED light source in the first row may be supplied via each data line. Thus, the LED light sources in the first row may emit light based on their respective specified data information. Thereafter, the LED light sources in the first row may maintain lighting.

Figure 10:
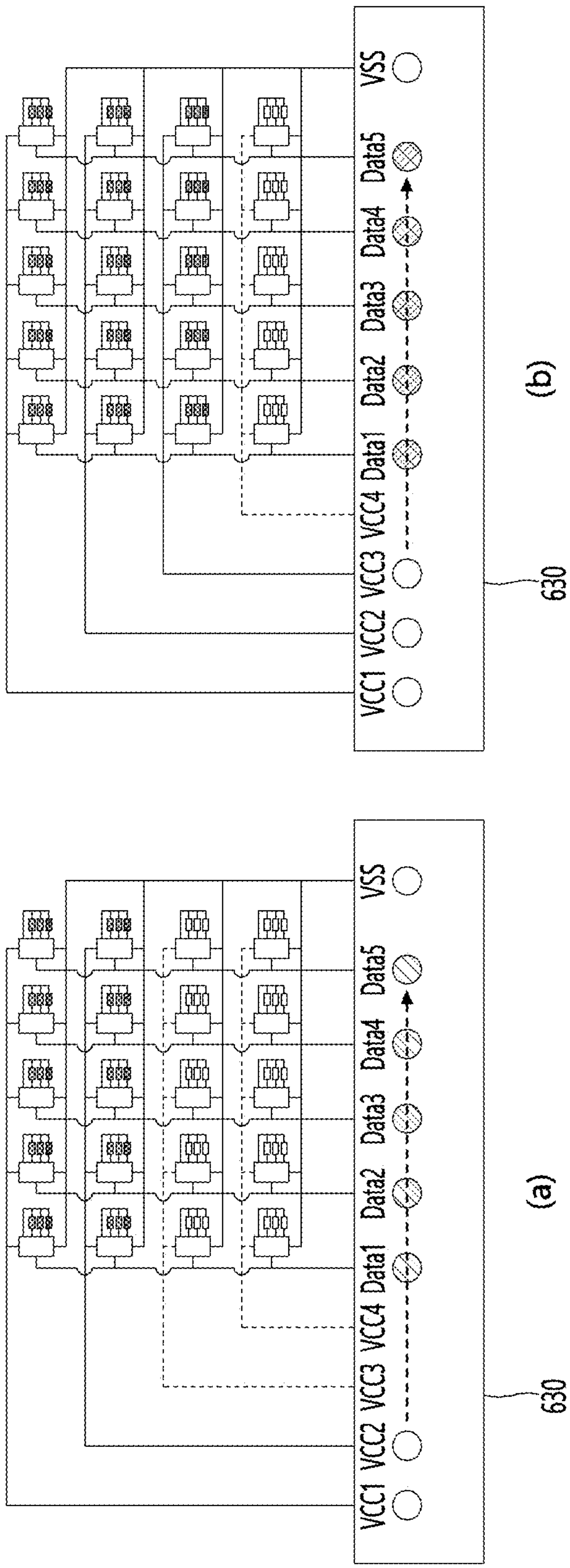

Next, (a) of FIG. 10 illustrates an operation after (b) of FIG. 9, wherein the LED light sources in the first row that are turned on in (b) of FIG. 9 may remain lit in the same state when the power voltage condition is satisfied, and the control circuit 630 may supply a reference voltage to the driver IC 620 in the second row to control the LED light sources of the second row. Thus, similarly to what has been described above, the driver ICs 620 in a second row may be switched to the ready mode, and the control circuit 630 may then supply data signals required to control the emission of the LED light sources in the second row. In this case, despite the supplied data signals, the driver ICs 620 in the first row may not respond because they are already in the drive and control mode. Therefore, when the data signals corresponding to the second row are supplied, only the driver ICs 620 in the second row may perform driving and control operations in response to the signals.

Figure 11:
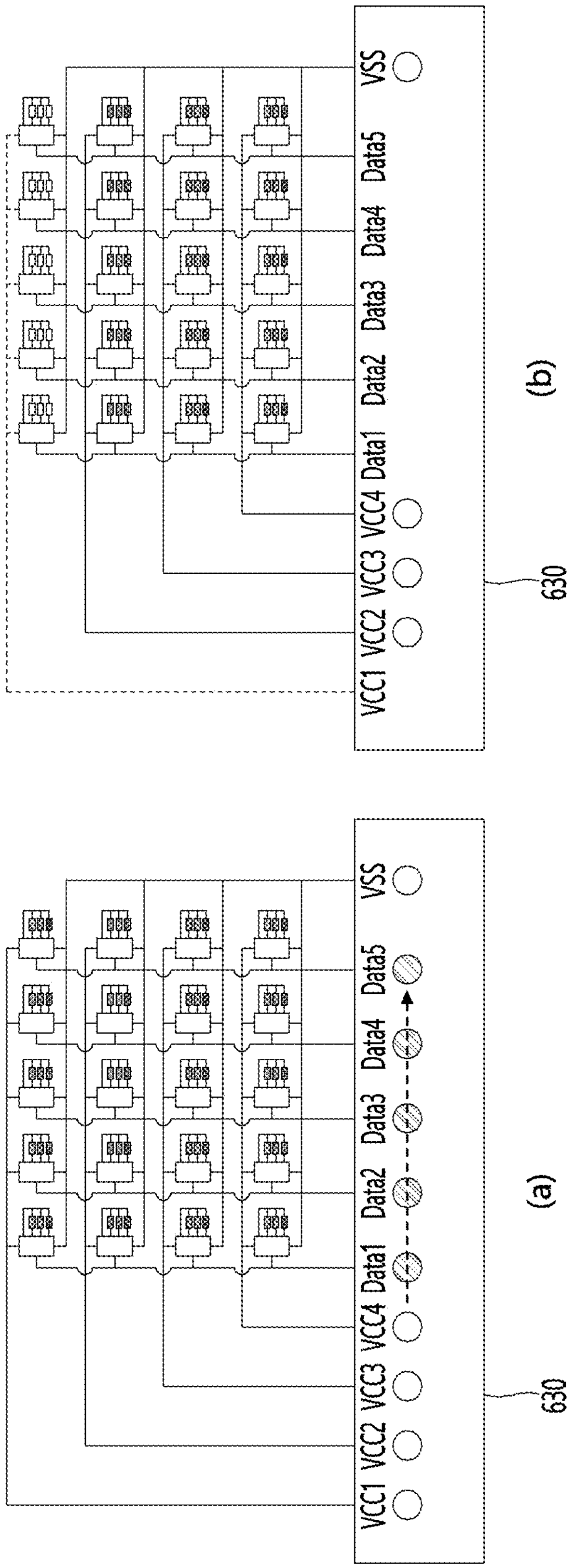

In (b) of FIG. 10 and (a) of FIG. 11, for the third and fourth rows, the driver ICs 620 and LED light sources may be driven and controlled in the same manner as described above.

Starting from the state in (a) of FIG. 9 described above and reaching the state in (a) of FIG. 11, processing of one frame for input signals, that is, control of driving of all LED light sources, may be completed.

In other words, LED light sources may be turned on for lighting by control of a power voltage and data lines. This makes it possible to implement a display, and when power is maintained on all lines, the lighting of the LED light sources may also be maintained.

Next, to switch to a new display screen, for example, as shown in (b) of FIG. 11, the power voltage of a desired line may be lowered below a reference voltage. When the voltage is lowered below the reference voltage, the driver ICs 620 in the corresponding row may turn off the LED light sources and switch to the sleep mode. In this case, the LED light sources in the remaining rows may be maintained in the lighting state.

Figure 12:
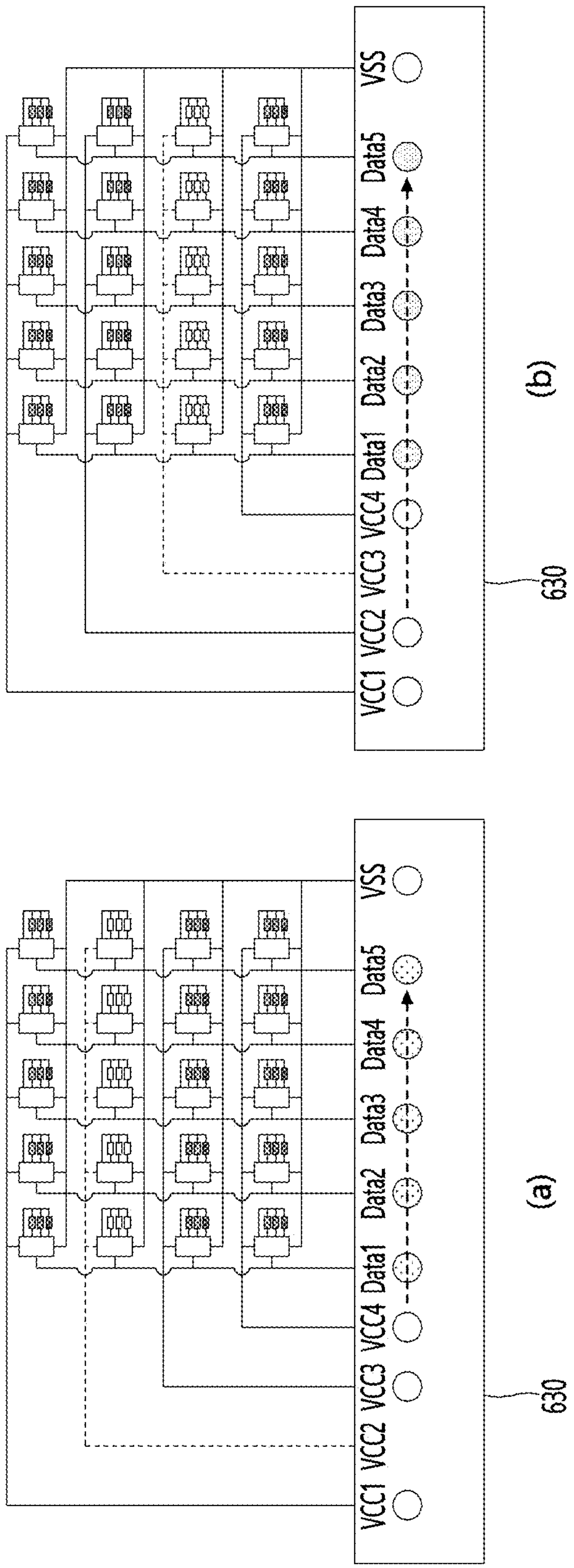

For convenience of description, in FIG. 11, (b) illustrates a step down in voltage for the power source of the line corresponding to the first row. In FIG. 12, (a) illustrates a step down in voltage for the power source of the line corresponding to the second row and (b) illustrates a step down in voltage for the power source of the line corresponding to the third row. In this way, for example, the power voltages may be sequentially stepped down for lines, reset, and then stepped up again to write new data.

Meanwhile, as described above, referring to (a) of FIG. 12, when there is a step down in voltage for the power source of the line corresponding to the second row, but in (b) of FIG. 11, the reference power voltage is again supplied (i.e., voltage increase) to the first row in which the LED light sources had been turned off, the driver ICs 620 in the corresponding line are switched back to the ready mode and may receive data for switching to a new display screen and drive and control the LED light sources in the corresponding row.

In other words, when it is needed to change the LED light source lighting condition of a new line, as described above, it is possible to change the LED light source lighting condition by performing control according to the power voltage conditions of a corresponding line.

Meanwhile, as shown in (a) to (b) of FIG. 12, a row where the LED light sources that had emitted light for the existing display screen existed are sequentially turned on and off to be driven and controlled for the new display screen.

According to the embodiments of the present invention shown in FIGS. 9 to 12 described above, all control for driving is performed very quickly based on digital signals.

Meanwhile, unlike FIGS. 9 to 12, according to another embodiment of the present disclosure, for example, for energy efficiency, it is possible to update only the line information where a display area changes, which is advantageous because it is not constrained by the need to operate and control a line in a set sequence within a set time as in the conventional AM operation method, due to characteristic in which LED light sources are turned on once and maintained.

In relation thereto, FIG. 13 illustrates simultaneous control of a plurality of lines.

This is different from writing or erasing data through driving control of turning on/off LED light sources on a row-by-row basis in FIGS. 9 to 12 described above.

In (a) of FIG. 13, the LED light sources in the first and fourth rows are driven and controlled simultaneously, and in (b) of FIG. 13, the LED light sources in the second and third rows are driven and controlled simultaneously.

In this case, in FIG. 13, since the data lines are controlled in units of columns rather than in units of rows, separate control for data lines may be required when multiple rows are driven simultaneously.

According to an embodiment, supplied data may be provided all at once in the form of one file, which need to be originally provided sequentially for columns, and may be selected from the LED light sources of the corresponding column of each row.

In this case, in relation to the above selection, by providing an identifier in a header part of data corresponding to each row and column or by adding, to the header part, identification information such as coordinate information corresponding to an LED light source, LED light sources in corresponding row and column may be driven and controlled to be turned on/off or maintain the existing state by selecting data from all pieces of data received.

According to another embodiment, data is supplied continuously to a target row and column, but in a predetermined order, a pre-arranged method may also be used in which the first supplied data is used for the LED light sources corresponding to the highest row, and the second supplied data is used for the LED light sources corresponding to the next highest row. In the example of (a) of FIG. 13, power is supplied to two rows, that is, the first row and the fourth row, and data is supplied to columns continuously in two times, the first supplied data being used to the LED light source in the first row and the second supplied data being used for the LED light sources in the fourth row. In (b) of FIG. 13, data supply control may be performed for the LED light sources in the second and third rows in the same manner.

In this case, since only the order is defined or promised to each other and there is no need to add separate identification information to the data, control of driving of the LED light sources may be performed more simply and efficiently without a need to change the data structure.

In FIG. 13, simultaneous control of two rows is described as an example, but it is not limited hereto, and simultaneous control may be performed on a plurality of rows and by randomly selecting rows.

According to another embodiment, according to the present disclosure, even in a case where switching a previous display screen to a new display screen, as described above, as described above, when the data of only some rows needs to be changed according to the properties, types, or the like of the data constituting a screen by comparing a previous screen and a screen to be switched rather than going through the process of (b) of FIG. 11 to (b) of FIG. 12 in which sequential driving of rows is controlled, the power voltage in a corresponding row is stepped down and then stepped up to change only the data in the row to turn on/off only the LED light sources in the row to change the data, thereby maximizing the driving control efficiency of the LED light sources and reducing power consumption when switching screens.

Figure 14:
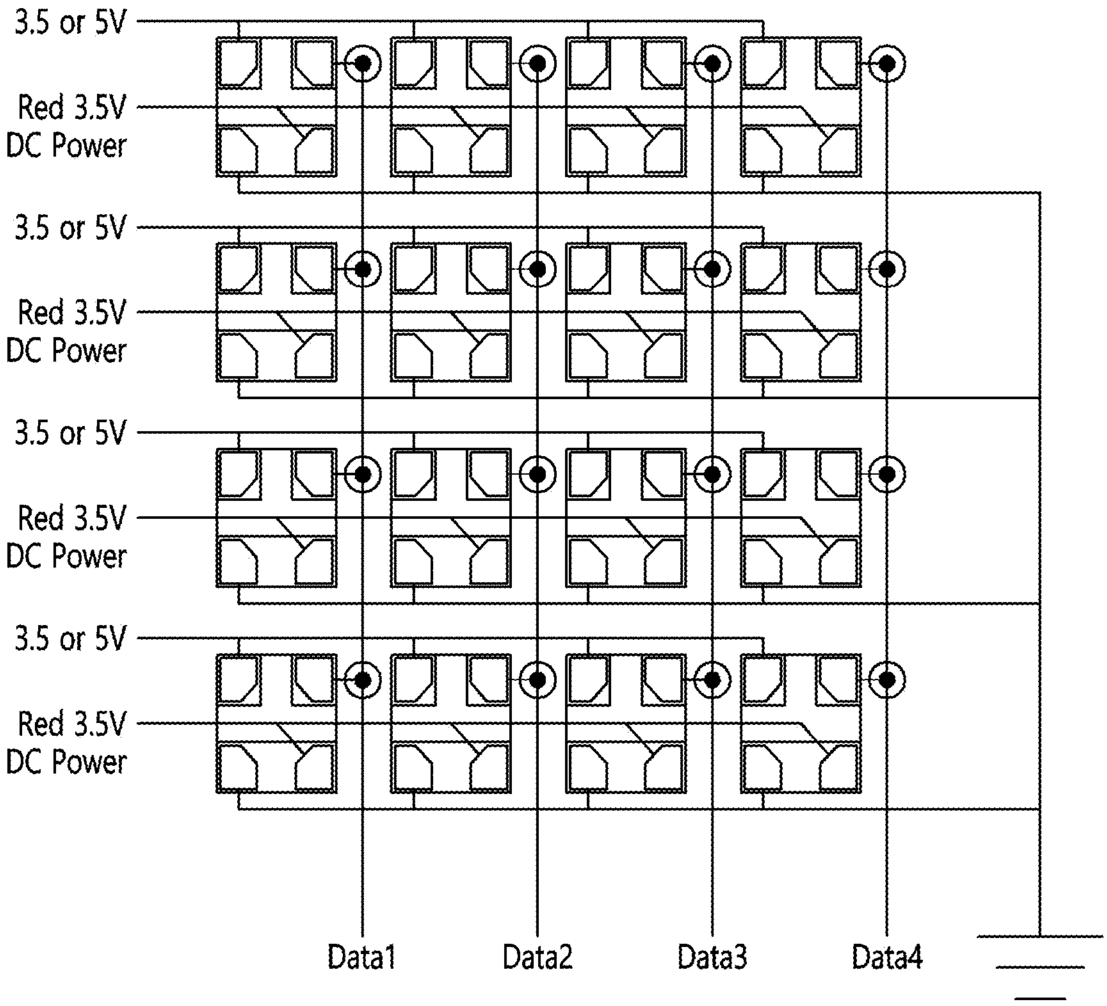
FIG. 14 is a diagram for describing a method of controlling a power voltage for an LED light source according to an embodiment of the present disclosure.

FIG. 14 is a diagram for describing a method of controlling a power voltage for an LED light source according to an embodiment of the present disclosure.

With reference to FIG. 14, an embodiment in which driving of LED light sources is controlled by controlling the voltage level of a supplied power.

In the present disclosure, the lighting of LED light sources is controlled to be turned on/off by using an operation of stepping down the level of a supplied power voltage or stepping up the level to the reference voltage.

However, in LED light sources, heat generation occurs frequently due to R compared to G and B subpixels, which may affect the operation of elements and shorten the elements' lifespan.

For example, in the case of G and B among subpixels in an LED light source, when a reference voltage of 5 v is required as an operating voltage, 4 v is sufficient for R, but since 5 v is equally supplied to R, which may cause the cause of heat generation.

Therefore, in FIG. 14, power voltage supply lines for G and B of subpixels and a power voltage supply lines for R are formed in an LED light source, and power voltages applied to the supply lines are individually controlled, specifically, only the power voltage of 4 v or 3.5 v is supplied to R to be turned on/off, thereby minimizing or preventing heat generation due to R.

In the above description, 3.5 v is calculated based on the driving power voltage of 4 v for R, for example.

Meanwhile, the reference voltage described in the specification is 4 v to 5 v, and the voltage for turning off the LED light sources through a step down in voltage is 0 v or 3.5 v, but are not limited thereto. LED light sources may be turned off by appropriately selecting the LED light sources when the voltage is stepped down compared to an operating reference voltage, which may be applied to the present disclosure.

Figure 15:
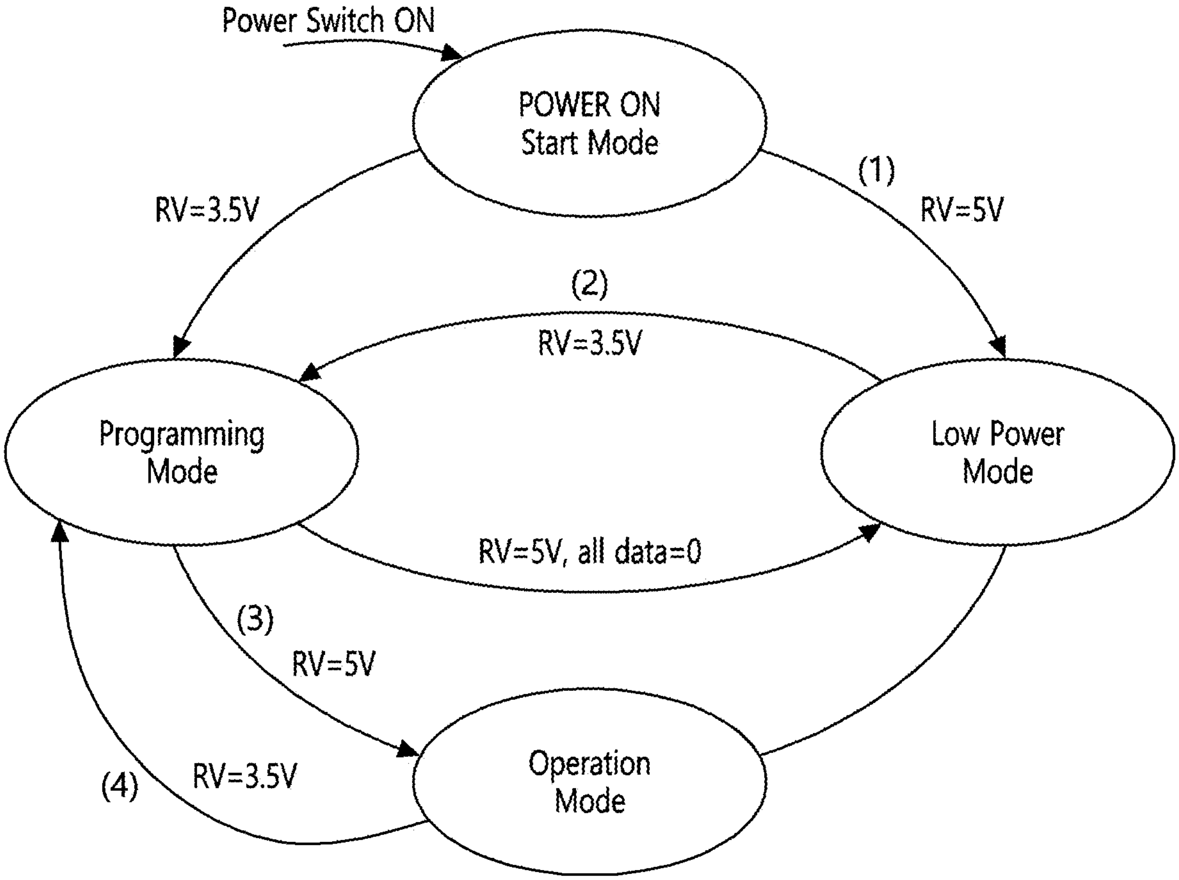
FIG. 15 is a diagram for describing mode switching by a power supply line according to an embodiment of the present disclosure.

FIG. 15 is a diagram for describing mode switching by a power supply line according to an embodiment of the present disclosure.

Figure 16:
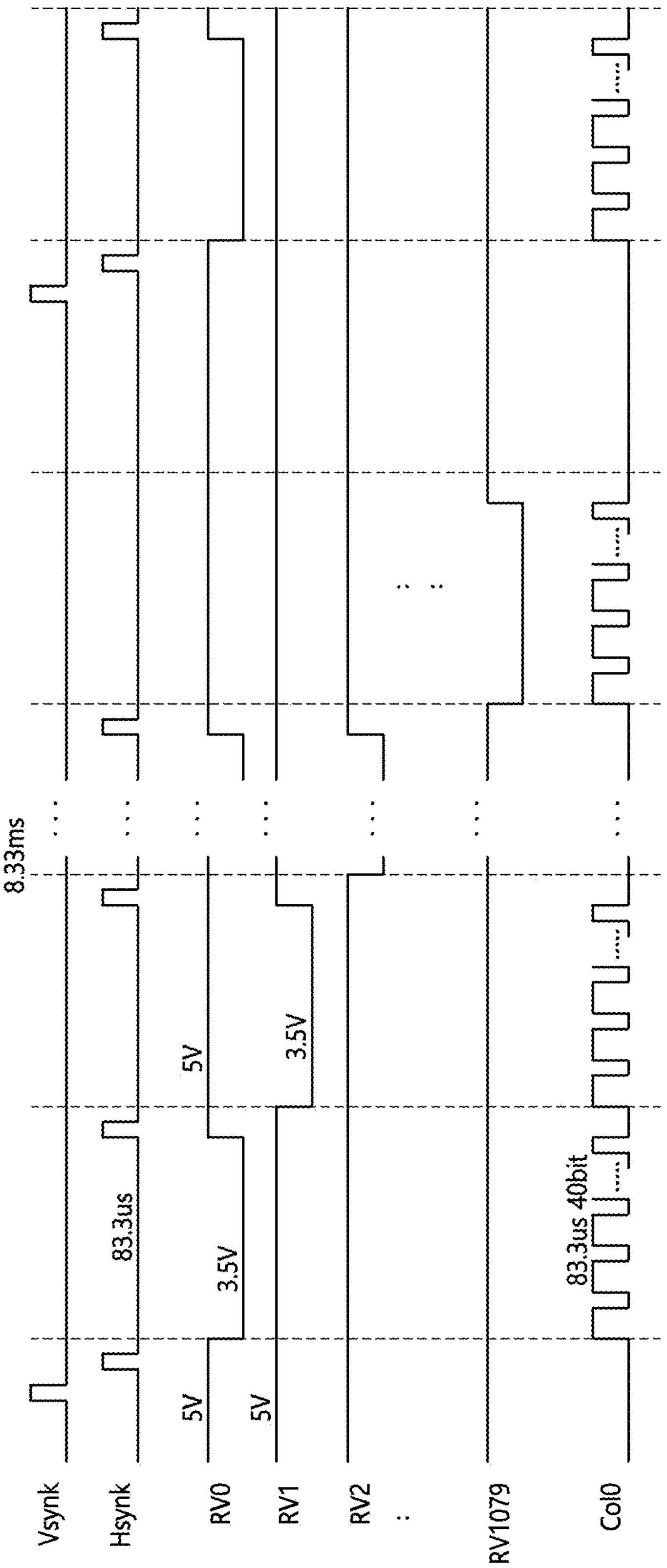
FIG. 16 is a diagram for describing timing control in FIG. 15.

FIG. 16 is a diagram for describing timing control in FIG. 15.

When a power switch is turned on, the power-on start mode starts and switching to a low power mode is performed when a reference voltage (for example, 5 v) is supplied as a column voltage (RV).

Here, when the column voltage (RV) is changed to 3.5 v, the low power mode may be switched to a programming mode.

When switched to the programming mode, the column voltage (RV) may be set as the reference voltage to switch to an operation mode.

After switching to the operating mode, the column voltage (RV) has been stepped down to 3.5 v to switch back to the programming mode.

In the power-on start mode, when the column voltage (RV) is set to 3.5 v from the beginning, it may be switched directly to the programming mode rather than the low power mode.

Additionally, when the column voltage (RV) is set as the reference voltage in the programming mode, the mode data becomes '0' and it may be switched to the low power mode.

FIG. 16 illustrates a timing control method when 100×100 & 120 frames are configured. In this case, one frame may be 1/120, that is, 8.33 ms, and a column may be 8.33 ms/100, that is 83.3 us.

Referring to FIG. 16, a total of 1080 RVs (RV0 to RV1079) are illustrated, and only one column (Col) for supplying a data signal is illustrated.

In the column (Col), it can be seen that timing is controlled such that data are be written to RV in the section where RV's standard voltage, 5 v, has dropped to 3.5 v.

Referring to the above-described example, a bit rate in FIG. 16 may be sufficient to be 500 kh, but is not limited thereto.

Figure 17:
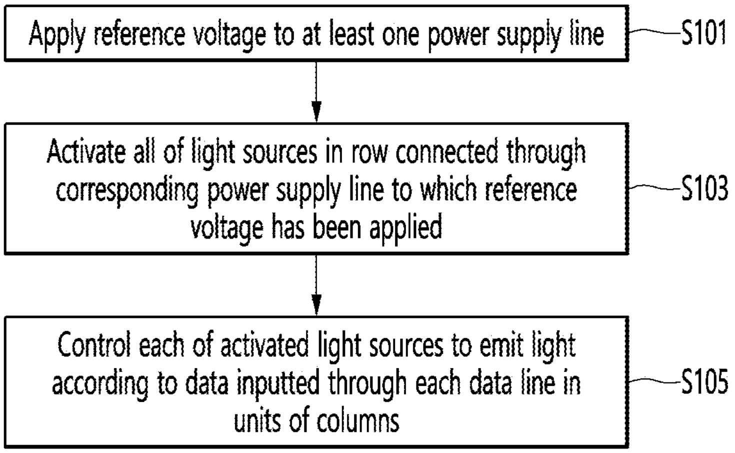
FIG. 17 is a flowchart for describing an operating method of the display device according to an embodiment of the present disclosure.

FIG. 17 is a flowchart for describing an operating method of the display device 100 according to an embodiment of the present disclosure.

Referring to FIG. 17, an operating method of a display device including a display panel including a plurality of light sources and driver ICs connected to the plurality of light sources, a control circuit configured to supply a power voltage and a data signal to the driver ICs via at least one power supply line and a data line according to an input signal, is described as follows.

The control circuit 630 may apply a reference voltage to the at least one power supply line (S101).

The control circuit 630 may activate all of light sources in a row connected through the corresponding power supply line to which the reference voltage is applied (S103).

The control circuit 630 may perform control such that activated light sources emit light according to data input via data lines in units of columns (S105).

In this case, in each of the driver ICs 620, may include a data input terminal connected to a data line via which data is supplied and a power supply terminal connected to a power supply line to receive power, as shown in FIG. 7 described above.

The control circuit 630 may perform control such that the reference voltage is sequentially supplied to power supply lines in units of rows.

The control circuit 630 may perform control such that the reference voltage is simultaneously supplied to a plurality of power supply lines in units of rows.

Meanwhile, the driver IC 620 may include a first power supply terminal connected to one data input terminal and a power supply line, and a second power supply terminal connected to ground. The first power supply terminal is connected to power supply lines for sub-pixels G and B to supply a reference voltage.

The second power supply terminal is connected to a power supply line for a sub-pixel R to supply a voltage lower than the reference voltage.

The control circuit 630 may perform control to drop supply voltages of some power supply lines among all of the power supply lines.

The control circuit 630 may perform control to stop the supply of the reference voltage to only some of the power supply lines according to the input signal.

Even if not specifically mentioned, the order of at least some of the operations disclosed in the present disclosure may be performed simultaneously, may be performed in an order different from the previously described order, or some operations may be omitted/added.

According to an embodiment of the present disclosure, the above-described method may be implemented with codes readable by a processor on a medium in which a program is recorded. Examples of the medium readable by the processor include a ROM (Read Only Memory), a Random Access Memory (RAM), a CD-ROM, a magnetic tape, a floppy disk, an optical data storage device, and the like.

The display device as described above is not limited to the configuration and method of the above-described embodiments, but the embodiments may be configured by selectively combining all or part of each embodiment such that various modifications can be made.

INDUSTRIAL APPLICABILITY

According to the display device according to the present disclosure, a light source or package of a new structure is proposed, and by employing this in a display device, the efficiency of light source control may be maximized while heat generation can be reduced, so it has industrial applicability.

What is claimed is:

1. A display device comprising:

a display panel including a plurality of light sources and driver integrated circuits (ICs) connected to the plurality of light sources; and a control circuit configured to supply a power voltage and a data signal to the driver ICs via at least one power supply line and a data line according to an input signal, wherein the control circuit is configured to:

apply a reference voltage to the at least one power supply line, activate all light sources connected in a row via a corresponding power supply line to which the reference voltage is applied, and perform control such that activated light sources emit light according to data respectively input via data lines in units of columns, wherein the driver ICs are switched to sleep, ready, and drive/maintain mode states based on a level of power voltage input via the control circuit, and wherein the driver IC operates in or transition to a sleep mode based on the level of the power voltage being less than a reference voltage, operates in or transition to a ready mode based on the level of the power voltage being the reference voltage, and operates in or transition to the drive/maintain mode based on the level of the power voltage being greater than the reference voltage.

2. The display device of claim 1, wherein each of the driver ICs has a data input terminal connected to a data line via which data is supplied, and a power supply terminal connected to a power supply line to receive power.

3. The display device of claim 2, wherein the control circuit is configured to perform control such that the reference voltage is sequentially supplied to power supply lines in units of rows.

4. The display device of claim 2, wherein the control circuit is configured to perform control such that the reference voltage is simultaneously supplied to a plurality of power supply lines in units of rows.

5. The display device of claim 1, wherein the driver IC includes a first power supply terminal connected to one data input terminal and a power supply line, and a second power supply terminal connected to ground.

6. The display device of claim 5, wherein the first power supply terminal is connected to power supply lines for sub-pixels G and B to supply a reference voltage, and wherein the second power supply terminal is connected to a power supply line for a sub-pixel R to supply a voltage lower than the reference voltage.

7. The display device of claim 1, wherein the control circuit is configured to perform control to drop a supply voltage of some power supply lines among all the power supply lines.

8. The display device of claim 1, wherein the control circuit is configured to perform control to stop supply of the reference voltage to only some of the power supply lines according to the input signal.

9. An operating method for a display device, the display device including a display panel that includes a plurality of light sources and driver integrated circuits (ICs) connected to the plurality of light sources, and a control circuit that supplies a power voltage and a data signal to the driver ICs via at least one power supply line and a data line according to an input signal, the operating method comprising:

applying a reference voltage to the at least one power supply line;

activating all of light sources connected in a row via a corresponding power supply line to which the reference voltage is applied; and performing control such that activated light sources emit light according to data respectively input via data lines in units of columns, wherein the driver ICs are switched to sleep, ready, and drive/maintain mode states based on a level of power voltage input via the control circuit, and wherein the driver IC operates in or transition to a sleep mode based on the level of the power voltage being less than a reference voltage, operates in or transition to a ready mode based on the level of the power voltage being the reference voltage, and operates in or transition to the drive/maintain mode based on the level of the power voltage being greater than the reference voltage.

10. The method of claim 9, wherein each of the driver ICs has a data input terminal connected to a data line via which data is supplied, and a power supply terminal connected to a power supply line to receive power.

11. The method of claim 10, wherein the power supply lines in units of columns are controlled such that the reference voltage is sequentially supplied to power supply lines in units of rows.

12. The method of claim 10, wherein the power supply lines in units of columns are controlled such that the reference voltage is simultaneously supplied.

13. The method of claim 9, wherein each of the driver ICs includes a first power supply terminal connected to one data input terminal and a power supply line, and a second power supply terminal connected to ground, wherein the first power supply terminal is connected to power supply lines for sub-pixels G and B to supply a reference voltage, and wherein the second power supply terminal is connected to a power supply line for a sub-pixel R to supply a voltage lower than the reference voltage.

14. The method of claim 9, wherein the display device is controlled to perform control to drop a supply voltage of some power supply lines among all the power supply lines.

15. The method of claim 9, wherein the display device is controlled to stop supply of the reference voltage to only some of the power supply lines according to the input signal.

* * * * *